United States Patent [19]
Gerber

[11] 3,991,742
[45] Nov. 16, 1976

[54] SOLAR ENERGY HEAT TRANSFER SYSTEM

[75] Inventor: Dennis H. Gerber, Los Gatos, Calif.

[73] Assignee: Burke Industries, Inc., San Jose, Calif.

[22] Filed: Jan. 9, 1975

[21] Appl. No.: 539,651

[52] U.S. Cl. ............................................. 126/271
[51] Int. Cl.² ........................................ F24J 3/02
[58] Field of Search ........................... 126/270, 271

[56] References Cited
UNITED STATES PATENTS

| | | |
|---|---|---|
| 3,022,781 | 2/1962 | Andrassy ............................. 126/271 |
| 3,146,774 | 9/1964 | Yellott ................................ 126/271 |
| 3,513,828 | 5/1970 | Masters .............................. 126/271 |
| 3,768,264 | 10/1973 | Best .................................... 126/271 |
| 3,868,945 | 3/1975 | Konopka et al. ................... 126/271 |
| 3,894,369 | 7/1975 | Schmitt et al. ..................... 126/270 |

Primary Examiner—Lloyd L. King
Attorney, Agent, or Firm—James R. Cypher

[57] ABSTRACT

A heat transfer system for the heating of water by solar energy. The apparatus is especially suitable for heating large quantities of water by small temperature increments by circulating the water in repeated cycles in a thin layer between two thin flexible sheets of a dark colored panel. The apparatus includes one or more large panels disposed on a sloping surface exposed to the sun. A pumping means supplies a continuous supply of water to be warmed to the upper edge of the panel. A distributor pipe, evenly distributes the water along the top edge of the panel where it flows over a member for spreading the water evenly over the entire surface area of the inside of the panel. A collector pipe collects the water at the bottom edge of the panel and a return piping system returns the warmed water to the pool of water.

10 Claims, 18 Drawing Figures

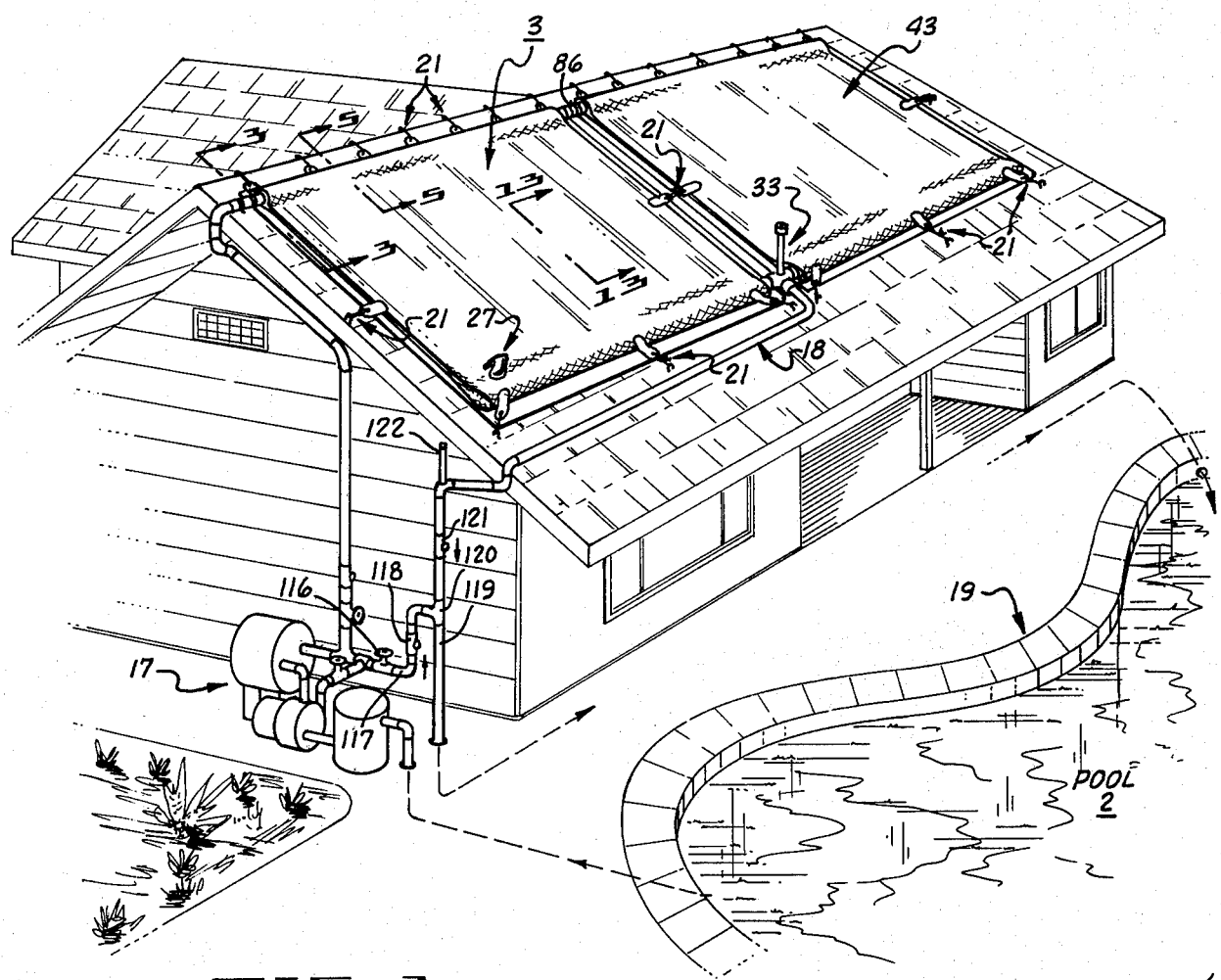
FIG_1
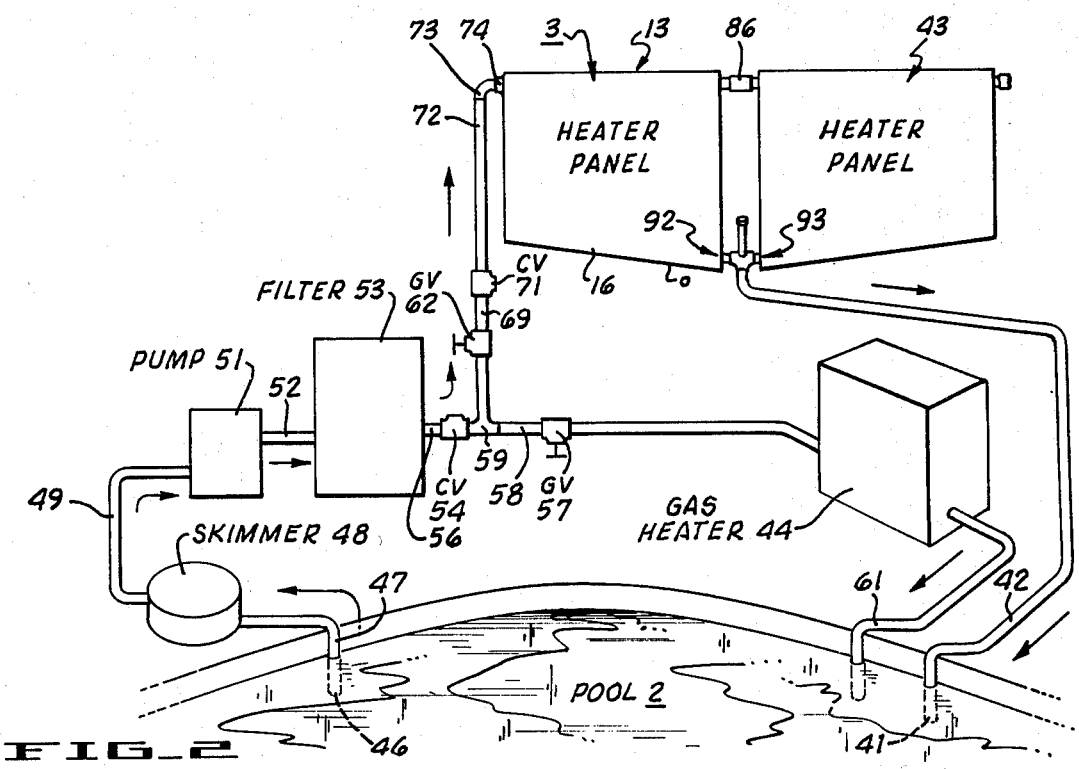
FIG_2

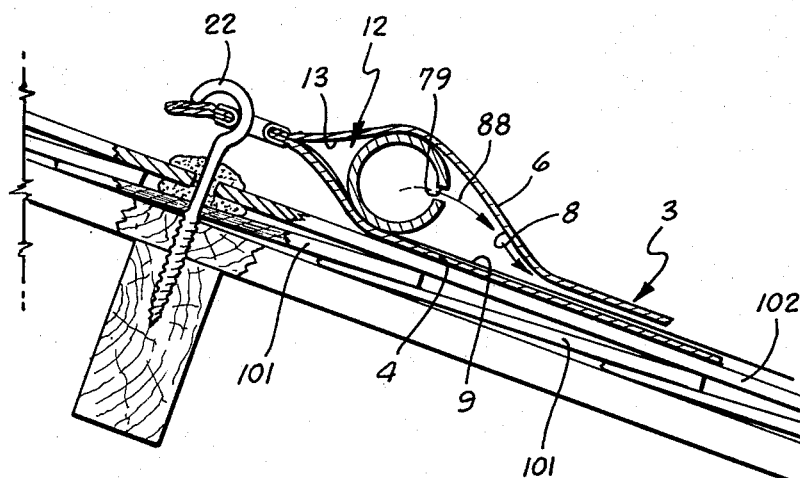
FIG_3
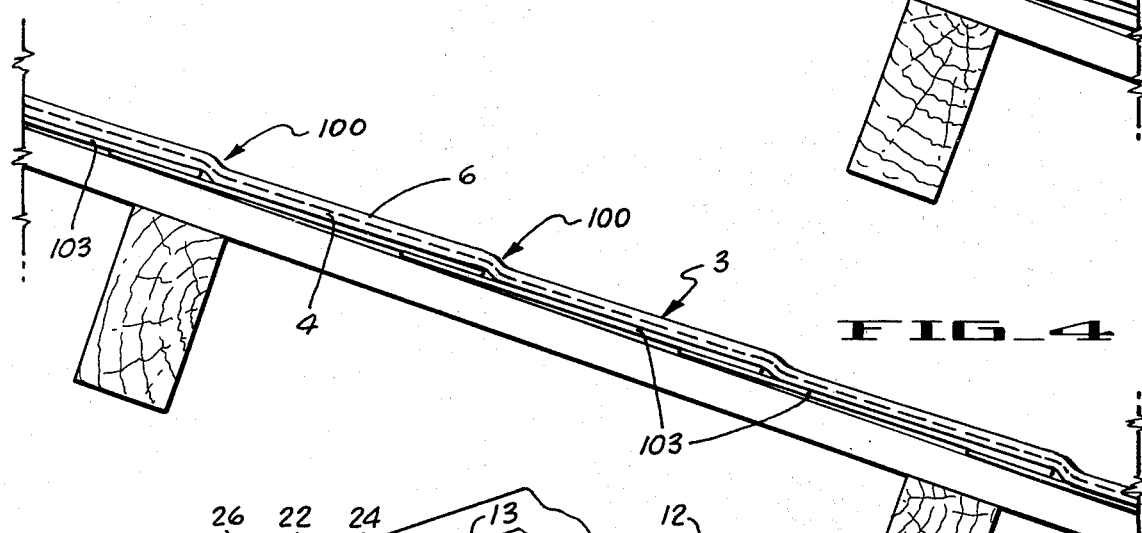
FIG_4
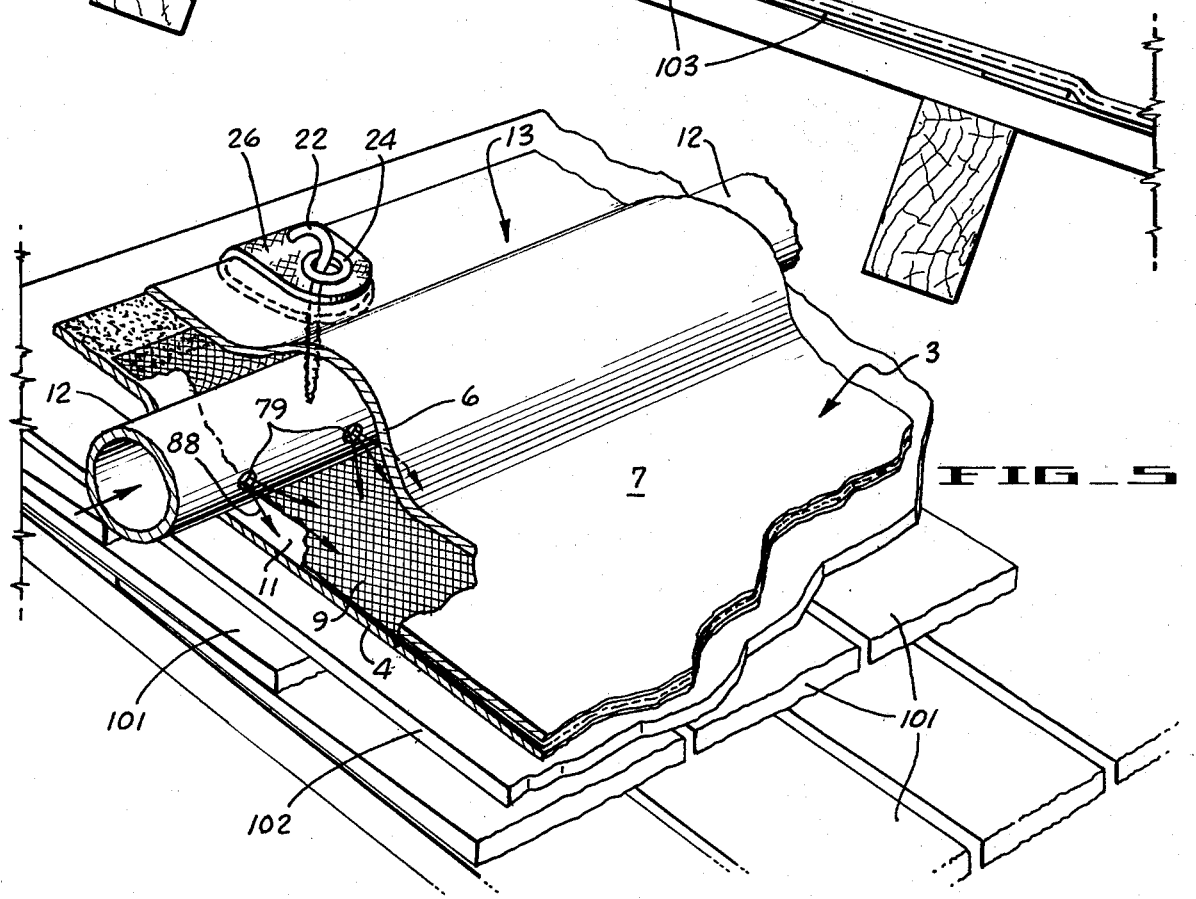
FIG_5

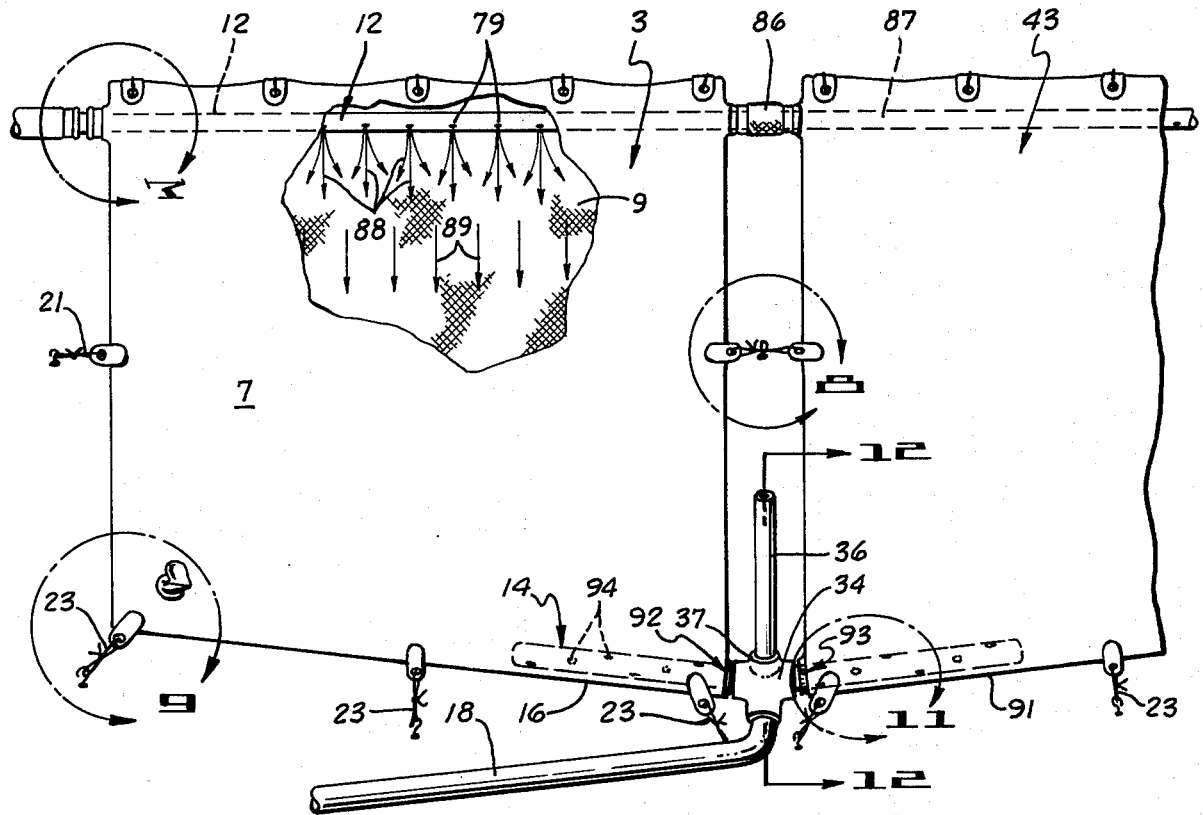
FIG_6
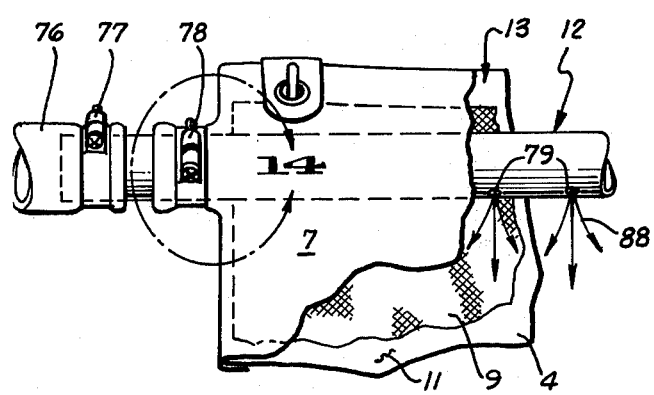
FIG_7
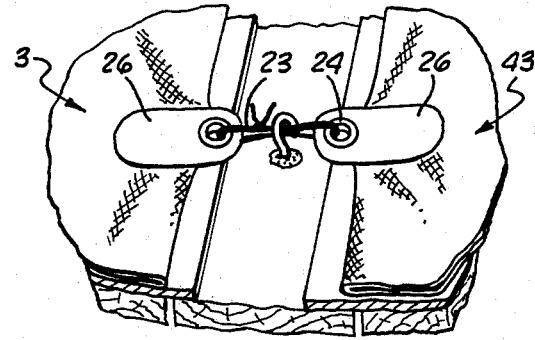
FIG_8
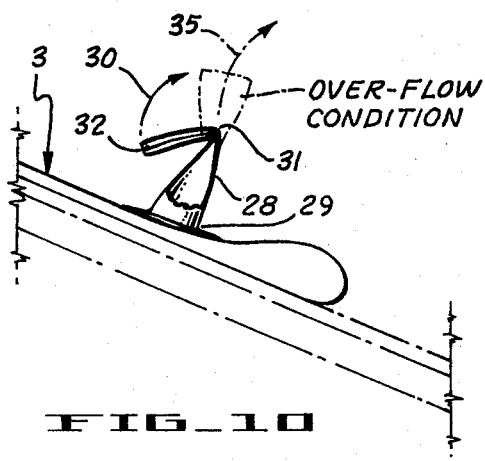
FIG_10
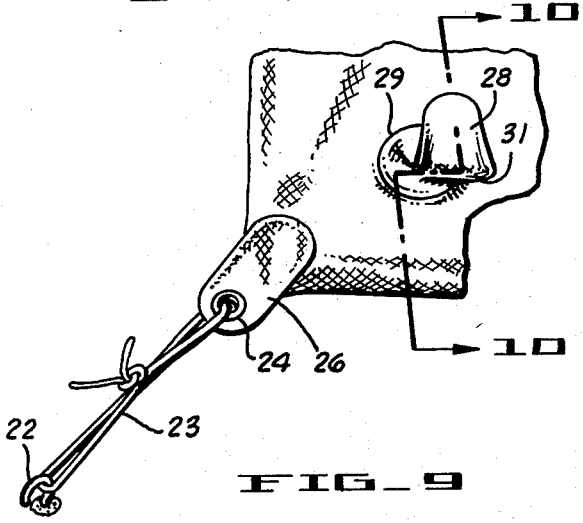
FIG_9

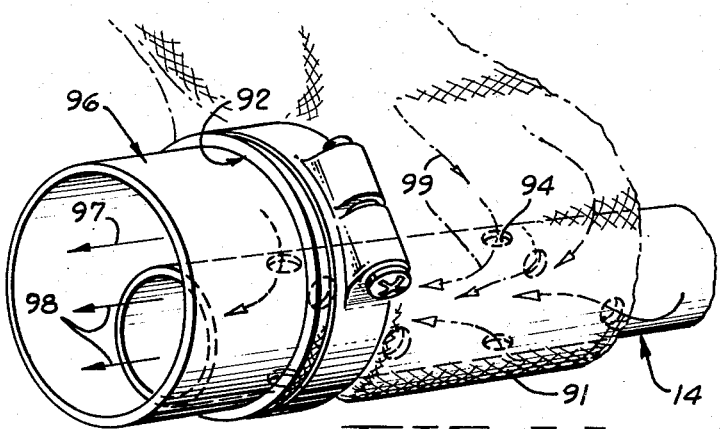
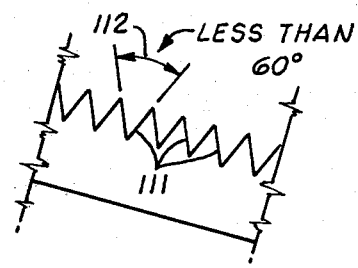
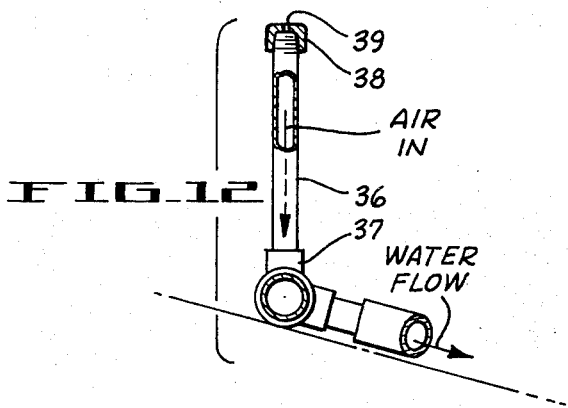
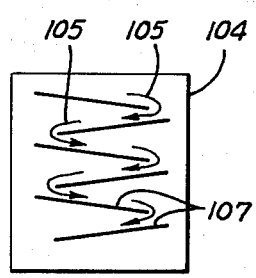
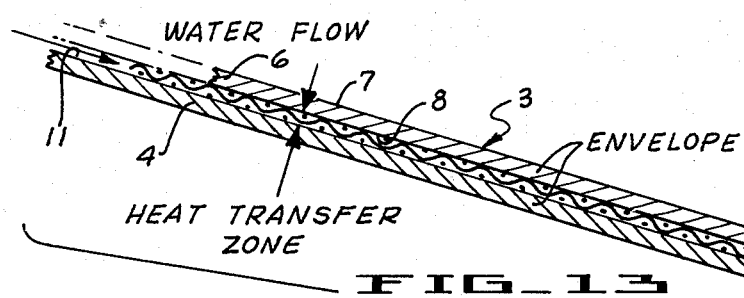
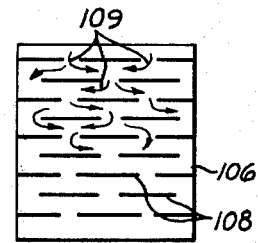
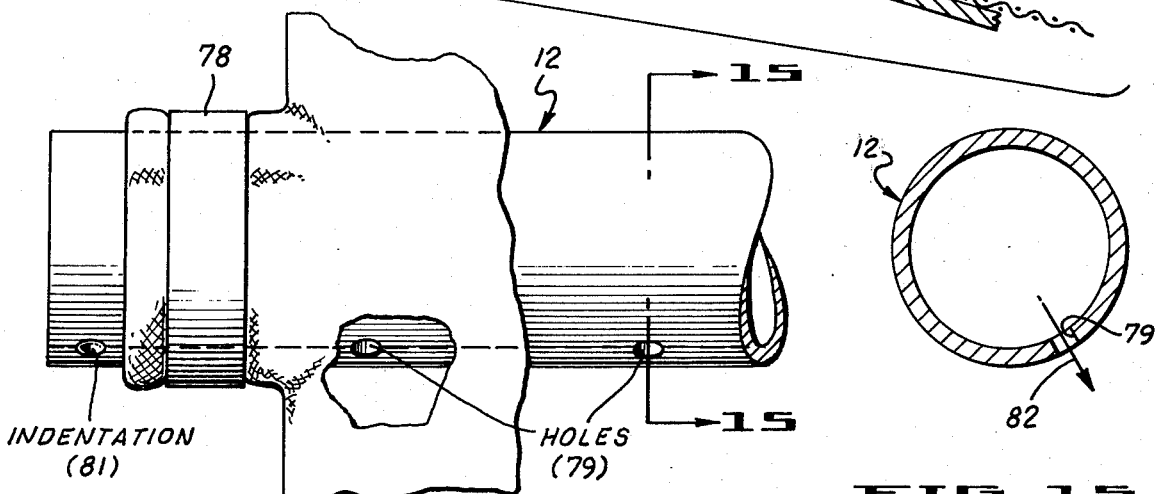

SOLAR ENERGY HEAT TRANSFER SYSTEM

BACKGROUND OF THE INVENTION

In 1960 there were 300,000 swimming pools in use in the United States and the number was increasing at the rate of 15,000 per year. At the present time there are probably in excess of 500,000 swimming pools. Nearly all swimming pools have some type of water heater which uses some type of fossil fuel. The energy requirement for swimming pools alone is enormous, and costly.

Since most swimming pools are found in warmer climates or used during the summer seasons in northern latitudes, the use of solar energy to heat swimming pools is a natural but largely neglected resource.

Utilization of solar energy for swimming pools has been heretofore thought impractical because of our present preoccupation with attempts to duplicate present fossil fuel heating systems which heat small amounts of water to very high temperatures in a short period of time. Another deterrent has been the lack of materials which can withstand continuous exposure to the sun for long periods of time without rapid deterioration.

There are many solar heaters in use today but they either depend upon transparent top members which become opaque or dirty in time and lose their efficiency, or they are made of materials which lose their structural integrity with long exosure to direct sunlight.

SUMMARY OF THE INVENTION

The basic principle of the present invention is the use of an apparatus which absorbs solar energy and transfers nearly all of this energy to a thin film of water which is continuously flowed adjacent the absorbing material. The water is at a much lower temperature than the heat absorber thus maximizing the thermal transfer. Further, the water is kept moving at a fairly rapid rate so that the temperature rise in the water is relatively low thereby keeping the solar energy absorber temperature low and minimizing energy loss by the solar panel by radiation and convection.

The heart of the present system is a large flexible panel which is made from a flexible sun and weather resistant elastomer. Ethylene propylene elastomer (sometimes sold under the trademark Nordel) and chlorsulfonated polyethylene (sometimes sold under the trademark Hypalon) are uniquely suitable for this use in that they have unusually high resistance to degradation under direct sunlight. The panel may be laid directly on asphalt shingle sloping roofs or on a suitable underlayment where the roof is constructed of thick wood shakes or tiles.

An object of the present invention is to provide a relatively inexpensive solar heating system which can be used by itself or in conjunction with standard pool heaters to warm swimming pool water.

Another object of the present invention is to provide a solar heating panel for general purpose heating of water.

Another object of the present invention is to provide a system which can be easily installed on the roof of a building by the average homeowner without the use of special installation tools or skills.

A further objective is to reduce or totally eliminate a pool owner's dependence on fossil fuel energy for heating his swimming pool.

Still another object is to provide a system which can be easily dismantled and stored when the swimming pool is not in use during winter months or which may be dismantled and carried with the owner if he should wish to move.

A still further object is to provide a modular system which is suitable for heating larger pools by merely adding additional solar panels and standard piping.

An additional object is to provide a system which is lightweight and distributes the weight of the water over a broad area of the roof so that there is no danger of structural damage to the roof system.

Another object is to provide a system which utilizes the existing water pumping equipment of most pools.

Another object is to provide a panel which can be folded or rolled into a compact package which can be easily and inexpensively shipped to distant sites.

BRIEF DESCRIPTION OF THE DRAWINGS

FIG. 1 is a perspective view of a solar water system constructed in accordance with the present invention.

FIG. 2 is a schematic of the system shown in FIG. 1.

FIG. 3 is a cross section of a portion of the system taken along line 3—3 of FIG. 1. The heating panel is shown installed on a shake roof.

FIG. 4 is a cross section of a portion of a heating panel which is installed on a relatively smooth roof surface such as an asphalt shingle. The view is similar to the view shown in FIG. 3.

FIG. 5 is a perspective view of a portion of the heating panel taken in the vicinity of lines 5–5 of FIG. 1. Portions of the device are shown in cross section for purposes of clarity.

FIG. 6 is a plan view of a portion of the system shown in FIG. 1.

FIG. 7 is an enlarged plan view of a portion of the system shown in the vicinity of line 7 shown in FIG. 6. Portions are shown in cross section.

FIG. 8 is an enlarged perspective view of a portion of the system shown in the vicinity of line 8 in FIG. 6.

FIG. 9 is an enlarged view of a portion of the system shown in the vicinity of line 9 in FIG. 6.

FIG. 10 is a side view of a portion of the heating panel showing the operation of the overflow system. The view is taken in the vicinity of lines 10—10 of FIG. 9.

FIG. 11 is a perspective view of a portion of the return water system taken in the vicinity of line 11 in FIG. 6.

FIG. 12 is an enlarged cross section of a portion of the system taken along line 12—12 of FIG. 6.

FIG. 13 is an enlarged cross section of a portion of the heating panel taken along line 13—13 of FIG. 1.

FIG. 14 is an enlarged plan view of a portion of the system shown in FIG. 7 taken along line 14.

FIG. 15 is a cross section of the inlet pipe shown in FIG. 14 and taken along line 15—15.

FIG. 16 is a highly magnified view of the top surface of a modified heating panel.

FIG. 17 is a plan view of an underlayment for the solar heating panels shown in a greatly reduced scale.

FIG. 18 is a plan view of still another form of underlayment for the solar heating panels shown on the same scale as the underlayment shown in FIG. 17.

BRIEF DESCRIPTION OF THE PREFERRED EMBODIMENTS

The solar energy absorbing and heat transfer system for warming a pool of water 2 of the present invention consists briefly of a solar panel 3 including a water impermeable lower member 4 and a very thin, flexible upper member 6 which has a low reflective outer surface 7 and a wettable inner surface 8 and has high solar energy absorbing qualities; a thin, flexible spreader member 9 disposed between and in touching contact with a substantial portion of said inner surface of said upper panel member and said inner surface 11; a distributor member 12 disposed along the upper inner edge 13 for evenly distributing fluid across substantially the entire upper edge of said panel; a collector member 14 for collecting the fluid at the lower edge 16 of the panel; supply means 17 for continuously supplying fluid to the distributor member at a relatively constant rate; and gravity discharge means 18 connected to the collector member for returning the fluid to the body of fluid such as pool 19. Collector member 14 also prevents vacuum in the return line from pinching off and preventing discharge of fluid from the panel.

The upper member 6 of the panel 3 could be made of a rubber or plastic but because of the constant exposure to sunlight and in particular ultraviolet rays, degradation of the plastic or rubber would occur within a short period of time. One of the keys to the success of the present panel is the use of an ethylene propylene elastomer (hereafter EPE), one of which is sold under the trademark Nordel or chlorsulfonated polyethylene (hereafter CP), one of which is sold under the trademark Hypalon by DuPont de Nemours Co. of Wilmington, Delaware. Since only the upper member is subject to sunlight, only the upper member need be made from EPE or CP. For commercial reasons, however, it is probably more economical to make the entire panel from thin, flexible sheets of EPE or CP which are joined to form a container. The thickness of the sheets may range from approximately 5 to 60 mils but a 20–30 mil thickness is preferable. CP in the unprocessed form is whitish but may be mixed with any color. Preferably, the panel is constructed from CP which is black in color throughout the material rather than merely black on the surface. The estimated useful life of CP in the present application is at least 20 years if the panels are properly cared for.

One of the problems is using flexible sheet panels is the fact that water tends to flow in rivulets rather than in a thin sheet covering the entire surface of the panel. A fluid spreader 9 is placed between the upper and lower members of the panel. The spreader may be a screen such as a layer of vinyl-coated fiberglas screening expanded plastic netting or sheeting such as Delnet by Hercules; or Vexar by DuPont; nylon velvet, spun bonded plastic matting such as Typar by Dupont; or a coarse open weave Nylon or Dacron cloth. A very thin, open cell, large cell polyurethane foam sheet may also be used as a spreader member. The spreader not only serves to spread the water over the entire surface, but it also tends to separate the upper and lower layers of EPE or CP which have some tendency to stick together when exposed to the hot sun. It is not fully understood what causes the water to spread upon the screen, but it is believed that turbulence caused by the irregular spreader surface and capillary action within the spreader and between the spreader and panel plays some part in the process. The spreader is standard 18 × 16 threads per inch which is used for insect screening. The spreader is flexible so as to follow the contour taken by the flexible panel. Somewhat better spreading may be obtained by turning the spreader on the diagonal to the direction of fluid flow. Thickness of the screen is about 20 mils.

It has been found that the life of the panels is greatly extended if the EPE of CP sheets are prepared in an unvulcanized and/or not cross linked state when placed at the particular installation. The EPE or CP is unstressed in the unvulcanized or not cross linked state and it is believed that reduction of stress when the panels are placed on uneven surfaces such as roofs reduces deterioration due to sun light. Vulcanization and/or cross-linking occurs slowly in the sunlight. The panels take the shape of the underlayment or roof upon which they are resting.

As shown in FIG. 1, tension means 21 are connected to the sides of the panels. In addition to anchoring the panels to the roof, the tension means create tension in the upper panel member when an excess of fluid is in the panel thereby causing the upper member to be in tension. The action of the upper member pressing against the water tends somewhat to assist in spreading the water over the entire surface of the panel.

As shown in FIGS. 3, 5, and 9, the means for securing the tension means to the base may consist of an eye bolt 22 or other suitable fastener. The tension means may consist of an elastic cord 23 such as a Bungee cord. The elastic cord may be suitably attached to the panels by reinforced metal eye members 24 attached to the cord by reinforcing tabs 26.

In order to avoid over stressing the panels, or to avoid weight build-up on roofs, the panels are provided with overflow means. As shown in FIGS. 9 and 10, the overflow means consists of a short length of CP or EPE formed in the shape of a tube 28. The tube connects with a circular opening 29 in the panel. The tube is formed with a fold at line 31 which closes the opening during the normal operation. The walls of the end portion lay in close fitting relation so that air cannot enter the panel during normal operations of the system. If the panel overfills, the water pressure overcomes the crease in the tube and parts the walls of the end portion. The tube straightens out as illustrated by arrow 30 and the water flows out opening 32 in the tube as illustrated by arrow 35. The crease may be easily placed in CP or EPE by heating the material, as with a hair dryer, creasing the material, and holding it in the creased position until the material cools.

The panels of the present system are used in a gravity system. To insure that an excessive vacuum does not build up in the panels, vent means 33 are provided. As shown in FIGS. 6 and 12, the vent means may be connected to the discharge piping such as the tee 34. A short tube such as a plastic pipe 36 is connected to the tee at opening 37. The top of the opening may be provided with a cap 38 with an opening 39 to regulate the amount of air admitted to the system. The vent 33 may be at right angles to the roof as shown in FIGS. 1 and 12 or the vent pipe 36 may simply lay along the slope of the roof with the air opening at a higher elevation.

An unexpected benefit of the vent means is the fact that the water is continually aereated. Air is drawn into the system at the vent pipe and expelled beneath the water at discharge opening 41 in discharge pipe 42. In many cases, the air bubbles floating upward form the discharge pipe are in sufficient quantity to give a pleasant hydra-massage to a bather.

An advantage of the present system is the fact that additional panels can be added to the system to accommodate larger pools or simply to raise the temperature more quickly in any given pool. In FIG. 1, a second panel 43 is shown.

TYPICAL SYSTEM

FIG. 2 is a schematic of a typical installation in which the total system includes a fossil fuel heater 44 for use as a standby on cloudy or extraordinarily cool days or evening use.

Water 2 is removed from pool 19 at inlet opening 46 in inlet pipe47. The water is drawn off through skimmer 48 through pipe 49 by pump 51. THe water flows through pipe 52 where it is forced through filter 53. A check valve 54 in outlet line 56 of the filter prevents backflow of the filter. Water may be passed directly back to the pool after passing the filter by closing gate valves 62. A gate valve 57 in pipe 58, downstream of tee 59, regulates water flow to the heater 44 and hence back to the pool through pipe 61.

It should be noted that in an alternate piping arrangement, the water could always be run through a heater and then through the panels. In still another alternative arrangment, the water could be passed through the panels and then through the heater.

To route the filtered cool water to the roof and through panels 3 and 43, gate valve 57 is closed and gate valve 62 is opened. Water is forced through pipe 69, check valve 71, pipe 72, 90° bend 73 and then to distributor 12. As shsown in FIG. 7, a short piece of flexible tubing 76 is connected to pipe 74 by pipe clamp 77 and to header pipe 12 by pipe clamp 78.

A detail of the header pipe 12 is shown in FIGS. 14 and 15 in which a plurality of holes 79 of approximately ⅛ in. diameter are formed in a line at intervals of approximately two inches. An indentation 81 on line with openings 79 is formed in the end of the header pipe so that the openings can be properly aligned for discharging the water through the openings as indicated by arrow 82.

If a second panel 43 is required, a short flexible tubing member 86 is connected to the distal end of header pipe 12 and to the head end of a second header pipe 87. The second header pipe is constructed in the same manner as header pipe 12 and the distribution over the panel is the same as in the first panel.

As shown in FIG. 3, the header pipe 12 should be as nearly horizontal as possible and oriented so that the openings 79 discharge water approximately parallel to the panel 3 or at an angle slightly below the horizontal so that the upper sheet of the panel will not constrict the openings. Water flows in the general direction of arrows 88 from the openings 79. After the water leaves the openings, the main factor affecting the flow of the water is the gravity force so that the water generally flows downwardly as shown by the straight arrows 89. Other factors affect the flow path of the water through the panel such as the spreader member 9 which tends to cause the water to flow toward unwetted areas by capillary action and a general mixing turbulating or eddying of the water due to the physical displacement of the water. Capillary action is induced by the fact that the upper and lower members of the panel are very close together; being separated only by the thickness of the spreading member with its multitude of intersticial spaces. Another factor which has been previously mentioned is that since both the top and bottom members of the panel are thin flexible sheets, sudden surges of water cause the top member to lift off the spreader member, but the weight of the envelope tends to cause the water to spread out and assume a normal thin layer of water over substantially the entire panel.

As shown in FIGS. 2 and 6, it can be seen that the bottom edge 16 of panel 3 and the bottom edge 91 of panel 43 are formed on an angle so that the water will drain toward the discharge opening 92 in the panel 3 and the discharge opening 93 in panel 43.

A detail of one form of the apparatus for draining the panels is shown in FIG. 11. Collector member 14 having openings 94 randomly formed in the sidewalls of the pipe is laid along the bottom edge of the panel. Since the panel is made from flexible sheeting, the water will normally collect at the bottom edge of the panel and bulge outwardly slightly. To insure that the discharge end does not become closed, a short piece of piping 96 is inserted into the discharge opening 92 of the panel and the collector member which has a substantially smaller diameter is attached to the lower inside wall of the pipe 96. Water can thus flow directly through pipe 96 as shown by arrow 97 or through collector pipe 14 as shown by arrows 98. Water enters the collector through openings 94 as shown by arrows 99. Water flows through the tee fitting 34, through pipe 18 and returns to pool 19 through discharge opening 41.

FIGS. 3 and 5 illustrate a placement of the panels on a roof having thick wood shakes 101. While the panels would roughly follow the contour of the shakes, it is desirable to place some form of underlayment beneath the panel such as s sheet of material 102 which can withstand the sun and rain and will give a relatively flat surface.

FIG. 4 illustrates a roof in which the shingles 103 are thin asphalt composition or some other material in which the thin sheeting of the panel can easily follow the contour. Thus, the panel will take a slight bend as shown by arrows 100. As set forth above, preferably the panel is unvulcanized and/or cross linked when it is installed so that as the sun slowly vulcanizes and/or cross links the material, the sheeting will be unstressed and therefore withstand the effects of the sun for a longer period of time.

FIGS. 17 and 18 illustrate a unique feature of the panels of the present invention. Because the thin sheet panels will assume the shape of the underlayment, particularly if they are unvulcanized or not cross linked at the time of installation, special underlayment panels 104 and 106 can be used. Panel 104 is formed with protrudements 107 which are formed in straight lines arranged to cause water to follow a pattern of flow from one side of the panel to the other as shown by arrows 105. Thus without changing panels, by use of different underlayments, the water can be caused to travel a greater distance within the panel and thus have a longer time to absorb heat from the underside of the upper panel. The protrudements or ribs should be about 1/16 in. to ½ in. as required. The patterned underlayments will additionally turbulate the water, slowing it and therefore increase the heat collection.

Another form of underlayment is shown in FIG. 18 in which the protrudements 108 are formed in straight lines and the pattern causes the water to flow along a path indicated by arrows 109.

As still another alternative, a patterned surface could be placed inside the panel beneath the water distribution pipe and allow the water or fluid to flow across the surface. Such a surface could serve as the distributor member instead of the screening shown in FIG. 13.

FIG. 16 shows an alternate surface configuration for the top member of the panel member. In this form of the invention, the Hypalon or other material is formed with serrations presenting a multitude of surfaces 111 which form an angle of less than about 60° as indicated by arrow 112. A surface formed in this manner increases the surface area of the upper panel so as to be capable of absorbing more heat and also tends to lose less heat due to reflection of sun rays. The serrations should be approximately 1 to 10 mils deep.

OPERATION OF THE SYSTEM

Typically, the heat in the panels will rise from 2° to 8° F. for each cycle through the panel. Because of the constant water flow through the system, the temperature of the water in a standard pool can be raised to levels of 80° F. or more. Higher temperatures in shorter periods of time can be achieved by merely adding more panels. With the requisite number of panels for a given pool size, it is possible to keep the water at a comfortable temperature night and day.

The panels can be installed almost anywhere that there is an approximately 5 per cent inclined surface. A south-facing roof produces excellent results. At the present time, panels 8 ft. × 8 ft. and 8 ft. × 12 ft. are commercially available, but other sizes would be practical.

Standard pipes and fittings are used in the system. Commonly used sizes include 1 ¼ in. and 2 in. diameter P.V.C. pipes and fittings. If the existing pool does not have a pump, or if one wishes to bypass the existing heater and pump system, a pump may be added for circulating the water to the panels. The present panels are designed for a minimum flow rate of about 300 gallons per hour panel. A lesser flow rate may be used but the solar heat collection efficiency drops off with reduced flow rate. A greater flow rate is desirable provided the return piping can handle the volume.

The transfer of thermal energy of the present system is unique in that the water absorbs the heat at the inner surface 8 of the upper panel member rather than absorbing the sun rays directly through a pane of glass as in standard heat collectors or from absorbing heat from a black body located beneath the water. By absorbing heat from the top panel member rather than the bottom panel member, and by flowing water continuously through the panels, there is very little heat build-up in the bottom panel member which is in contact with the roof area. If the roof area covers a residential dwelling, the system actually helps to keep the dwelling cooler since the continuously running water removes the heat build-up which normally takes place on a roof.

Since the top and bottom members of the panels may be made of the same materials and in the identical manner, it is also possible to reverse the panels and expose the opposite side to the sun if the panels have been maintained on a flat surface, if the overflow relief tube is removed and placed on the reverse side.

Since the water absorbs heat from the underside of the top panel member, the surface 8 should be a hydrophillic surface which may be wetted.

The panel is made from thin material which provides for very rapid and efficient heat transfer through the material. Some other systems require thicker materials which do not allow for as efficient or as immediate heat transfer.

Use of a flexible material in the construction of the panels also permits the cycling of water at different flow rates to increase the temperature of the water to various levels depending on the particular application. For swimming pool heating, a high flow rate with a corresponding small increase in water temperature is most efficient, whereas for domestic water heating, a low flow rate with a corresponding high temperature rise may be more desirable.

While at present, EPE or CP is the most desirable material for making the panels, other materials having highh resistance to degradation due to sunlight may be used. Both materials should have a light fabric reinforcement in the material for reinforcement to contribute durability and dimensional stability to the panels.

In order to keep the pump 51 primed, it has been found that an arrangment as shown in FIG. 1 should be used. As water leaves gate valve 116, it flows upward through pipe 117, past check valve 118 and enters down pipe 119 at tee 120. Check valve 121 prevents water from the pump from being forced up to the roof panels. It has also been found that it is helpful to add an air vent 122 just as water drops vertically after leaving the roof.

I claim:

1. A gravity solar energy absorbing and heat transfer system for warming a pool of water comprising:
    a. a thin, large area solar panel including a water impermeable flexible lower member, and a very thin, flexible upper member which have substantially no connection therebetween and which has a low reflective outer surface and a wettable inner surface and has high solar energy absorbing qualities and the separation of said upper and lower members may vary depending upon the flow rate of the water supply;
    b. a thin, flexible fluid spreader sheet having an irregular surface disposed between and in touching contact with a substantial portion of said panel upper and lower members for creating turbulence in said water flow for wetting substantially all of said upper and lower panel members and said spreader maintains a substantially uniform minimum separation between said upper and lower panel members;
    c. a distributor member disposed along the upper inner edge of said panel for evenly distributing fluid across substantially the entire upper edge of said panel;
    d. a collector member for collecting the fluid at the lower edge of said panel;
    e. supply means for continuously supplying fluid to said distributor member at a relatively constant rate; and
    f. gravity discharge means connected to said collector member for returning said fluid to said body of fluid.

2. A solar water heater as described in claim 1 comprising:
    a. said upper member of said solar panel is made from an ethylene propylene elastomer or from chlorsulfonated polyethylene.

3. A solar water heater as described in claim 1 comprising:
   a. said upper and lower members of said solar panel are made of thin, flexible sheets of ethylene propylene elastomer or chlorsulfonated polyethylene and are joined to form a container.
4. A solar water heater as described in claim 1 comprising:
   a. said distributor member consists of a layer of vinyl coated Fiberglas screening, coarse open weave Nylon or Dacron cloth, perforated plastic sheet, or very thin, open cell, large cell polyurethane foam sheet, expanded plastic netting, nylon velvet or spun bonded plastic matting.
5. A solar water heater as described in claim 2 comprising:
   a. said ethylene propylene elastomer or chlorsulfonated polyethylene member is unvulcanized and/or not cross linked.
6. A solar water heater as described in claim 3 comprising:
   a. tension means connected to the sides of said panel; and
   b. means for securing said tension means to a base so as to maintain said upper panel member in contact with said lower member and to create tension in said upper member when an excess of fluid in said panel causes said upper member to separate from said lower member.
7. A solar water heater as described in claim 3 comprising:
   a. air vent means connected to said discharge means for preventing excessive negative pressure within said solar panel and for inducting air into said discharge means for aerating said fluid.
8. A solar water heater as described in claim 3 comprising:
   a. overflow means connected to said solar panel for discharging water directly from said panel when the capacity of said discharge means is exceeded.
9. A solar water heater as described in claim 3 comprising:
   a. a plurality of solar panels;
   b. said means supplying fluid to each of said panels; and
   c. said discharge means is connected to each of said panels.
10. A solar water heater as described in claim 8 comprising:
    a. said overflow means is constructed to prevent inflow of air to said panels during normal operation.

* * * * *